(12) United States Patent
Kunjukkannan

(10) Patent No.: US 11,451,695 B2
(45) Date of Patent: Sep. 20, 2022

(54) SYSTEM AND METHOD TO CONFIGURE AN IMAGE CAPTURING DEVICE WITH A WIRELESS NETWORK

(71) Applicant: e-con Systems India Private Limited, Chennai (IN)

(72) Inventor: Ashok Babu Kunjukkannan, Chennai (IN)

(73) Assignee: e-Con Systems India Private Limited

( * ) Notice: Subject to any disclaimer, the term of this patent is extended or adjusted under 35 U.S.C. 154(b) by 231 days.

(21) Appl. No.: 16/751,659

(22) Filed: Feb. 19, 2020

(65) Prior Publication Data

US 2021/0136270 A1 May 6, 2021

(30) Foreign Application Priority Data

Nov. 4, 2019 (IN) .............................. 201941044676

(51) Int. Cl.
*H04N 5/232* (2006.01)
*H04W 12/06* (2021.01)

(52) U.S. Cl.
CPC ............ *H04N 5/232* (2013.01); *H04W 12/06* (2013.01)

(58) Field of Classification Search
CPC ............... H04N 5/232; H04N 5/23206; H04N 5/23225; H04W 12/06; H04W 12/069; H04W 12/65; H04W 12/73; H04W 12/77; H04W 84/12; H04W 12/50; H04L 63/083
See application file for complete search history.

(56) References Cited

U.S. PATENT DOCUMENTS

| | | | |
|---|---|---|---|
| 8,115,819 B2 | 2/2012 | Anderson | |
| 9,357,184 B2 | 5/2016 | Brockway, III et al. | |
| 10,152,861 B2 | 12/2018 | Landry | |
| 2011/0069179 A1* | 3/2011 | Bathiche | H04N 5/247 348/207.1 |
| 2014/0047143 A1 | 2/2014 | Bateman et al. | |
| 2016/0077422 A1* | 3/2016 | Wang | G03B 37/04 348/38 |
| 2018/0035045 A1* | 2/2018 | Lai | G06V 30/413 |
| 2018/0213185 A1* | 7/2018 | Zeng | H04N 7/181 |

* cited by examiner

*Primary Examiner* — Christopher K Peterson
(74) *Attorney, Agent, or Firm* — Jason C. Cameron

(57) ABSTRACT

A system to configure an image capturing device with a wireless network is disclosed. The system includes a processing subsystem. The processing system is communicatively coupled to the image capturing device. The processing subsystem includes a data retrieving module, configured to retrieve data from at least one of a plurality of captured data associated with a wireless network. The processing subsystem includes a data analysing module, configured to analyse a plurality of retrieved data by an analysing technique in real time. The processing subsystem includes an identification module, configured to identify a corresponding wireless network based on a plurality of analysed data and also configured to generate command to connect with the corresponding wireless network. The processing subsystem includes a configuration module, is configured to connect the image capturing device with the corresponding wireless network based on a generated command in real time.

4 Claims, 4 Drawing Sheets

SYSTEM AND METHOD TO CONFIGURE AN IMAGE CAPTURING DEVICE WITH A WIRELESS NETWORK

CROSS-REFERENCE TO RELATED APPLICATION

This application claims the benefit of Complete patent application bearing Application No. 201941044676, titled "SYSTEM AND METHOD TO CONFIGURE AN IMAGE CAPTURING DEVICE WITH A WIRELESS NETWORK" filed on Nov. 4, 2019 in India.

FIELD OF INVENTION

Embodiments of a present disclosure relates to management of network cameras, and more particularly to a system to configure an image capturing device with a wireless network.

BACKGROUND

In recent years, the technological advancement in relation to cameras has progressed immensely. Earlier cameras would never have features, such as wireless communication capabilities. The incorporation of wireless communication capabilities into cameras provides a means for cameras to communicate with other devices. Communication with a particular device is controlled by usual manual selection process. Moreover, manual configuration with an unsecured network device might lead to many problems.

In conventional approach, a particular wireless network is selected manually. Here, credentials of the required wireless network are manually inputted for configuration. More efficient approach would be to provide a system for automatic detection of required credentials. Automatic detection of credentials as well as automatic configuration with a required wireless network enables extra security as it avoids connection to unsecured channel.

Hence, there is a need for an improved system for system to configure an image capturing device with a wireless network and a method to operate the same and therefore address the aforementioned issues.

BRIEF DESCRIPTION

In accordance with one embodiment of the disclosure, a system to configure an image capturing device with a wireless network is provided. The system includes a processing subsystem. The processing system is communicatively coupled to the image capturing device. The processing subsystem includes a data retrieving module. The data retrieving module is configured to retrieve data from at least one of a plurality of captured data associated with a wireless network.

The processing subsystem also includes a data analysing module. The data analysing module is operatively coupled to the data retrieving module. The data analysing module is configured to analyse a plurality of retrieved data by an analysing technique in real time.

The processing subsystem also includes an identification module. The identification module is operatively coupled to the data analysing module. The identification module is configured to identify a corresponding wireless network based on a plurality of analysed data. The identification module is also configured to generate command to connect with the corresponding wireless network.

The processing subsystem also includes a configuration module. The configuration module is operatively coupled to the identification module. The configuration module is configured to connect the image capturing device with the corresponding wireless network based on a generated command in real time. A memory subsystem is operatively coupled to the processing subsystem. The memory subsystem is configured to store the plurality of captured data and the plurality of analysed data.

In accordance with one embodiment of the disclosure, a method for configuring an image capturing device with a wireless network is provided. The method includes capturing a plurality of data. The method also includes retrieving data from at least one of a plurality of captured data associated with a wireless network.

The method also includes analysing a plurality of retrieved data by an analysing technique in real time. The method also includes identifying a corresponding wireless network based on a plurality of analysed data. The method also includes generating command to connect with the corresponding wireless network.

The method also includes connecting the image capturing device with the corresponding wireless network based on a generated command in real time. The method also includes notifying a user based on configured wireless network input.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
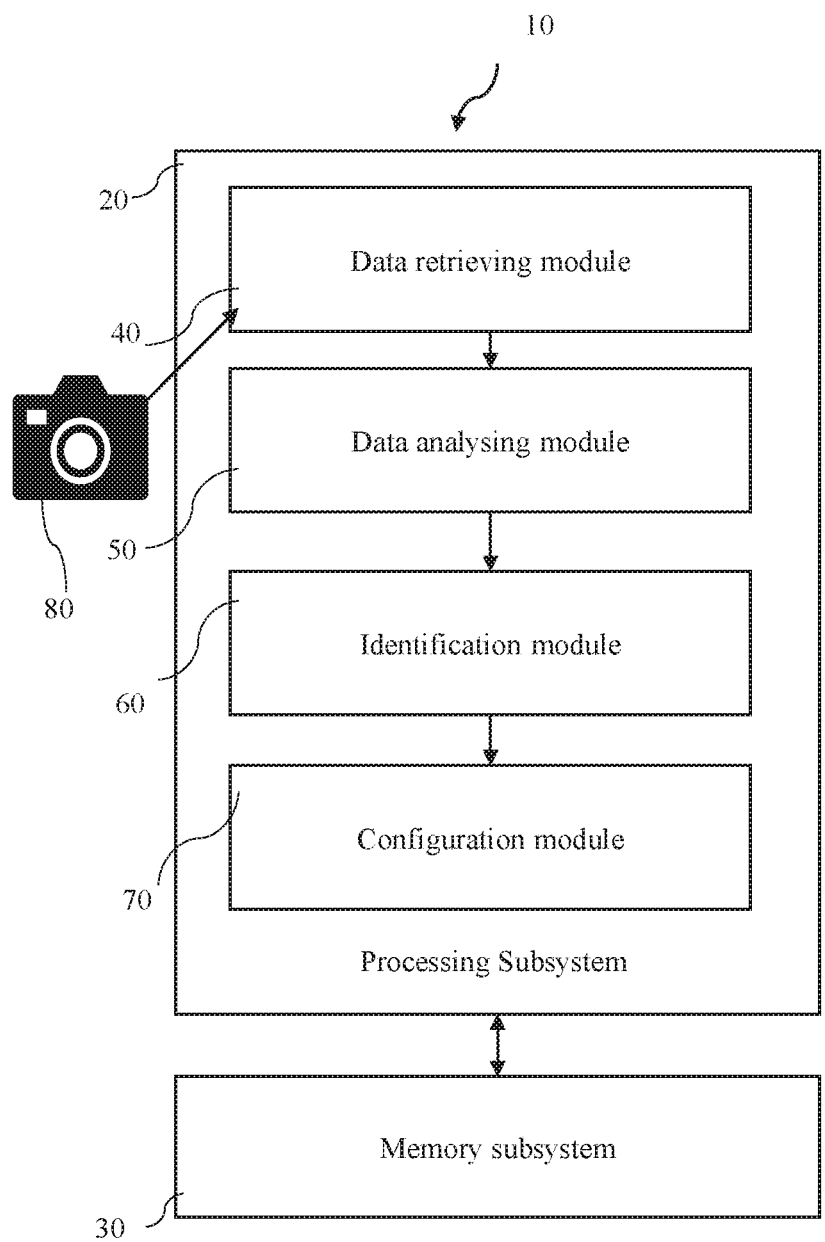
FIG. 1 is a block diagram representation of a system to configure an image capturing device with a wireless network in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a" "an", and "the" include plural references unless the context clearly dictates otherwise.

Embodiments of the present disclosure relate to a system to configure an image capturing device with a wireless network. The system includes a processing subsystem. The processing subsystem is communicatively coupled to the image capturing device. The processing subsystem includes a data retrieving module. The data retrieving module is configured to retrieve data from at least one of a plurality of captured data associated with a wireless network.

The processing subsystem also includes a data analysing module. The data analysing module is operatively coupled to the data retrieving module. The data analysing module is configured to analyse a plurality of retrieved data by an analysing technique in real time.

The processing subsystem also includes an identification module. The identification module is operatively coupled to the data analysing module. The identification module is configured to identify a corresponding wireless network based on a plurality of analysed data. The identification module is also configured to generate command to connect with the corresponding wireless network.

The processing subsystem also includes a configuration module. The configuration module is operatively coupled to the identification module. The configuration module is configured to connect the image capturing device with the corresponding wireless network based on a generated command in real time. A memory subsystem is operatively coupled to the processing subsystem. The memory subsystem is configured to store the plurality of captured data and the plurality of analysed data.

FIG. 1 is a block diagram representation of a system to configure an image capturing device with a wireless network 10 in accordance with an embodiment of the present disclosure. As used herein, the term "image capturing device" refers to a device for recording visual images in the form of photographs, film, or video signals.

In one embodiment, the image capturing device may comprise of webcam, Closed Circuit Television (CCTV) camera and the like. In another embodiment, the image capturing device substantially similar to an image sensing device. As used herein, the term "wireless network" refers to computer network that uses wireless data connections between network nodes.

It should be noted that for the purpose described herein, the image capturing device is turned into an ad hoc configuration mode for configuration. Any particular image capturing device comprises of different types modes scanning mode, advanced camera mode and the like.

During ad hoc configuration mode, the image capturing device captures a plurality of data. Here, both the image capturing device and the image sensing device may use "macro focus" feature to capture a plurality of data.

In another embodiment, the plurality of data comprises data synced within a pre-defined figure. In another such embodiment, the pre-defined figures comprise one of a unique code or a text. In yet another exemplary embodiment, the pre-defined figures may be configured from the metadata of previously synced data.

In one exemplary embodiment, the said image capturing device will scan the unique code to capture the data associated with the unique code. Here, the unique code may be one-dimensional code or two-dimensional code. In another exemplary embodiment, an optical character recognition technique is used to capture the data from any form of written data.

As used herein, the term "optical character recognition" (OCR) is the mechanical or electronic conversion of images of typed, handwritten or printed text into machine-encoded text, whether from a scanned document, a photo of a document, a scene-photo (for example the text on signs and billboards in a landscape photo) or from subtitle text superimposed on an image (for example from a television broadcast).

The system 10 includes a processing subsystem 20. The processing subsystem 20 includes a data retrieving module 40. The data retrieving module 40 is configured to retrieve data from at least one of a plurality of captured data associated with a wireless network. In such embodiment, the retrieved data includes access point Service Set Identifier (SSID), type of security protocol, wireless security password and the like.

In one embodiment, the Service Set Identifier SSID refers to name for a WIFI network. As used herein, the term "security protocol" is an abstract or concrete protocol that performs a security-related function and applies cryptographic methods, often as sequences of cryptographic primitives. As used herein, the term "password" refers to a secret word or phrase that must be used to gain admission to a wireless network.

The processing subsystem 20 also includes a data analysing module 50. The data analysing module 50 is operatively coupled to the data retrieving module 40. The data analysing module 50 is configured to analyse a plurality of retrieved data by an analysing technique in real time. In one embodiment, the analysing technique includes natural language processing technique, machine learning and the like. In another embodiment, the data analysing module 50 also analyses retrieved data for various errors.

As used herein, the term "natural language processing" (NLP) is a subfield of computer science, information engineering, and artificial intelligence concerned with the interactions between computers and human (natural) languages, in particular how to program computers to process and analyse large amounts of natural language data. As used herein, "machine learning" refers to an application of artificial intelligence (AI) that provides systems the ability to automatically learn and improve from experience without being explicitly programmed.

In continuation form the above stated specific example related to optical Character Recognition technique, the data retrieval module 40 uses various natural language technique to ascertain the associated data. In such exemplary embodiment, the system 10 by the help of the data analysing module 50, enables understanding of the specific associated data corresponding to the required wireless network.

The processing subsystem 20 also includes an identification module 60. The identification module 60 is operatively coupled to the data analysing module 50. The identification module 60 is configured to identify a corresponding wireless network based on a plurality of analysed data.

Furthermore, the identification module 60 is also configured to generate command to connect with the corresponding wireless network. In one embodiment, a generated command refers to instruction given by identification module 60 to a configuration module 70. In such embodiment, the instructions include connection instructions.

The processing subsystem 20 also includes a configuration module 70. The configuration module 70 is operatively coupled to the identification module 60. The configuration module 70 is configured to connect the image capturing device with the corresponding wireless network based on a generated command in real time.

Subsequently, after connection the image capturing device will stop functioning in relation to the said processing subsystem 20. In such embodiment, a notification module is configured to notify a user based on configured wireless network input. The notification module is operatively coupled to the configuration module 70. In one exemplary embodiment, the notification may be of Light emitting diode (LED) indication, sound alarm and the like.

A memory subsystem 30 is operatively coupled to the processing subsystem 20. The memory subsystem 30 is configured to store the plurality of captured data and the plurality of analysed data. In one embodiment, the storing may be in remote storage and local storage.

Figure 2:
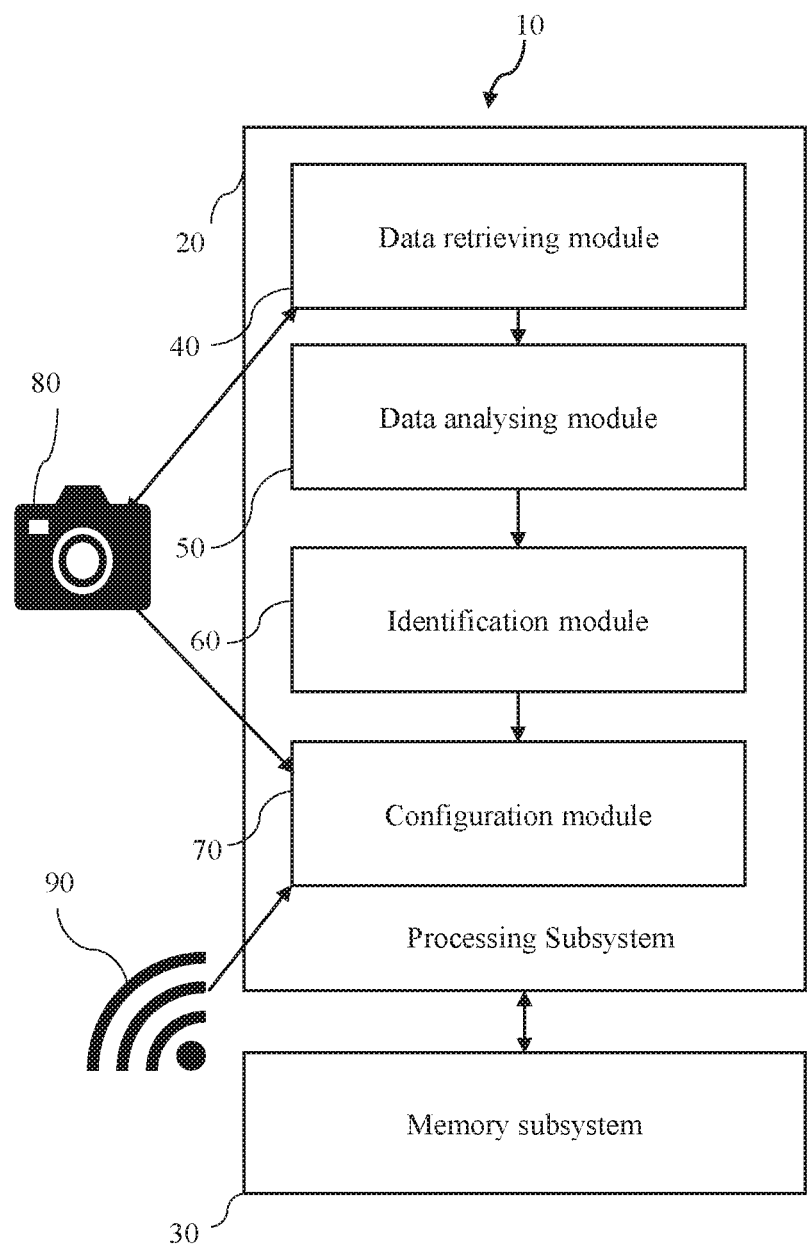
FIG. 2 is a schematic representation of an embodiment representing the system to configure the image capturing device with the wireless network of FIG. 1 in accordance of an embodiment of the present disclosure.

FIG. 2 is a schematic representation of an embodiment representing the system to configure a camera with a wireless network 10 of FIG. 1 in accordance of an embodiment of the present disclosure. In one exemplary embodiment, a camera X 80 is to be connected to a specific WIFI Z 90. Here, the camera X 80 behaves as an image capturing device.

The camera X 80 scans a barcode representing details of specific WIFI Z 90. A data retrieving module 40 retrieves the data associated the WIFI Z 90. The retrieved data is Service Set Identifier details as well as associated password.

A data analysing module 50 analyses the retrieved Service Set Identifier details as well as password. In one exemplary situation, the data analysing module 50 by the help of natural language processing analyses the password data for capital letters, small letters, special characters and the like.

Further, an identification module 60 identifies the WIFI Z 90. The identification module 60 then instructs a configuration module 70 of the processing subsystem 20 for connecting to the said WIFI Z 90. Here, the configuration module 70 connects the camera X 80 with the corresponding WIFI Z 90.

Lastly after connection, the camera X 80 notifies a user about the mode of operation through a LED light. In such exemplary situation the camera turns to streaming mode, after the connection.

The data retrieving module 40, the data analysing module 50, the identification module 60 and the configuration module 70 in FIG. 2 is substantially equivalent to the data retrieving module 40, the data analysing module 50, the identification module 60 and the configuration module 70 of FIG. 1.

Figure 3:
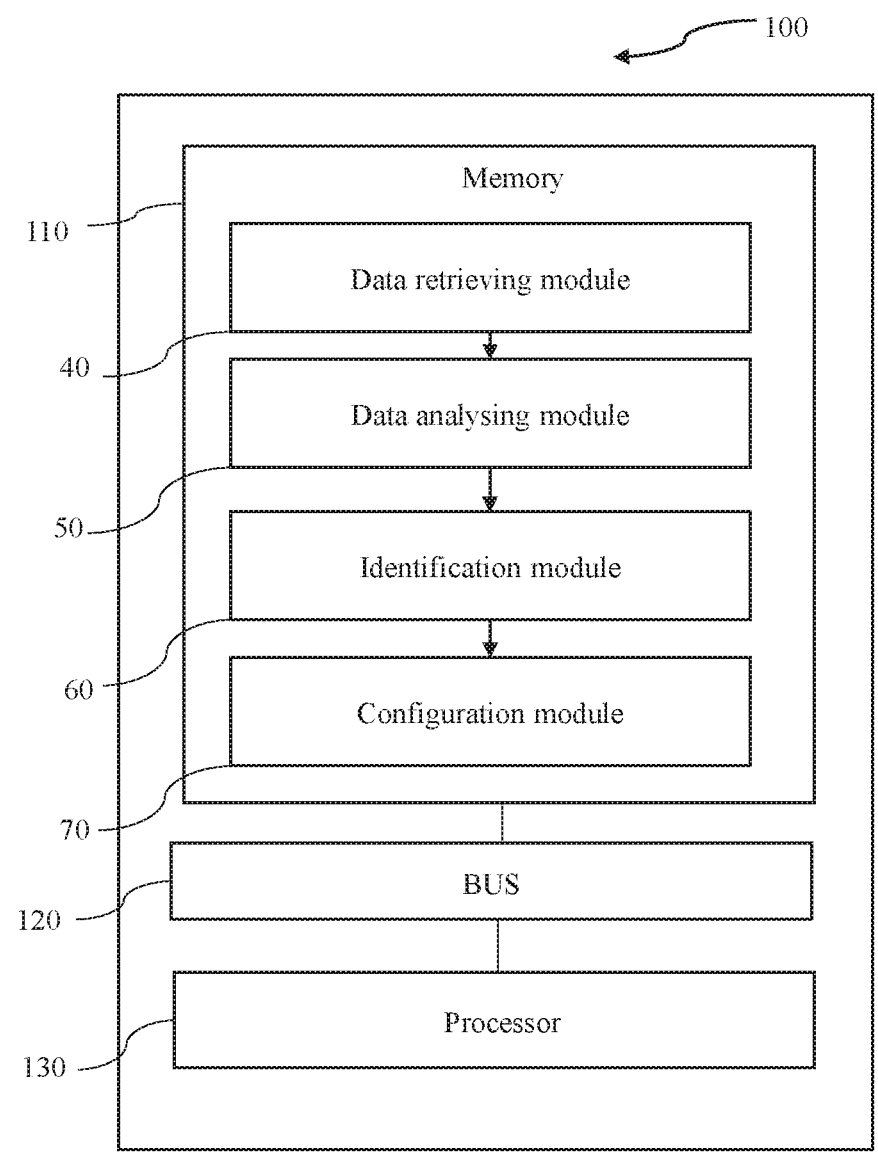
FIG. 3 is a block diagram of a computer or a server in accordance with an embodiment of the present disclosure.

FIG. 3 is a block diagram of a computer or a server 100 in accordance with an embodiment of the present disclosure. The server 100 includes processor(s) 130, and memory 110 coupled to the processor(s) 130.

The processor(s) 130, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 110 includes a plurality of modules stored in the form of executable program which instructs the processor 130 to perform the method steps illustrated in FIG. 1. The memory 110 has following modules: the data retrieving module 40, the data analysing module 50, the identification module 60 and the configuration module 70.

The data retrieving module 40 is configured to retrieve data from at least one of a plurality of captured data associated with a wireless network. The data analysing module 50 is configured to analyse a plurality of retrieved data by an analysing technique in real time.

The identification module 60 is configured to identify a corresponding wireless network based on a plurality of analysed data and also configured to generate command to connect with the corresponding wireless network. The configuration module 70 is configured to connect the image capturing device with the corresponding wireless network based on a generated command in real time.

The data retrieving module 40, the data analysing module 50, the identification module 60, the configuration module 70 is implemented as an integrated single module to achieve better performance in speed, cost and efficient integration.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 130.

Figure 4:
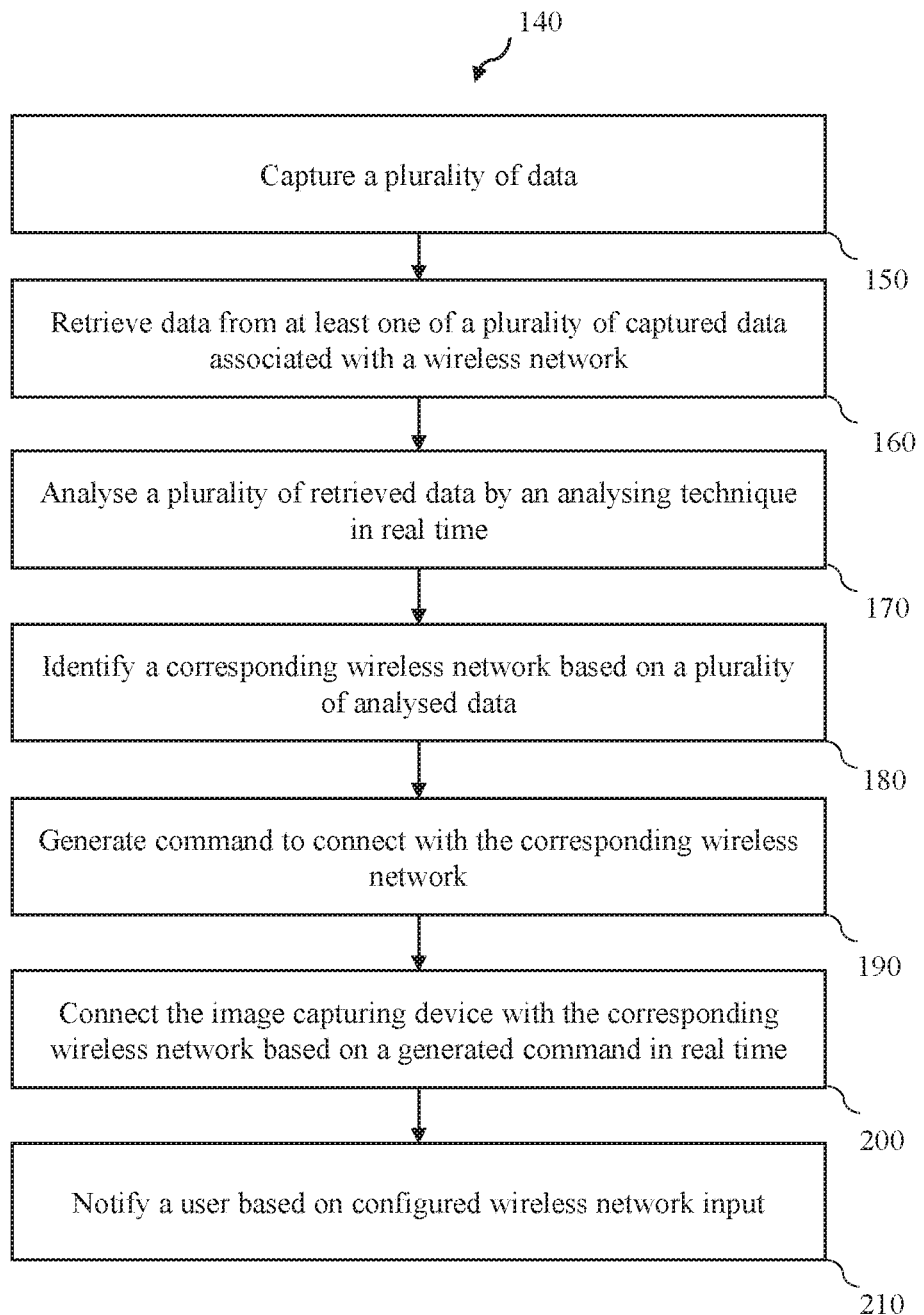
FIG. 4 is a flowchart representing the steps of a method for configuring an image capturing device with a wireless network in accordance with an embodiment of the present disclosure.

FIG. 4 is a flowchart representing the steps of a method for configuring an image capturing device with a wireless network 140 in accordance with an embodiment of the present disclosure. The method 140 includes capturing a plurality of data in step 150. In one embodiment, capturing the plurality of data includes capturing the plurality of data by an image capturing device. In one specific embodiment, capturing the plurality of data includes capturing the plurality of data by a camera. In another embodiment, capturing the plurality of data includes capturing the plurality of data comprising data synced within a pre-defined figures. In such embodiment, the pre-defined figures comprises one of a unique code or a text.

The method 140 also includes retrieving data from at least one of a plurality of captured data associated with a wireless network in step 160. In one embodiment, retrieving data from at least one of the plurality of captured data associated with the wireless network includes retrieving data from at least one of the plurality of captured data associated with the wireless network by a data retrieval module.

The method 140 also includes analysing a plurality of retrieved data by an analysing technique in real time in step 170. In one embodiment, analysing the plurality of retrieved data by the analysing technique in real time includes analysing the plurality of retrieved data by the analysing technique in real time by a data analysing module.

The method 140 also includes identifying a corresponding wireless network based on a plurality of analysed data in step 180. In one embodiment, identifying the corresponding wireless network based on the plurality of analysed data includes identifying the corresponding wireless network based on the plurality of analysed data by an identification module.

The method 140 also includes generating command to connect with the corresponding wireless network in step 190. In one embodiment, generating the command to connect with the corresponding wireless network includes generating the command to connect with the corresponding wireless network by the identification module.

The method 140 also includes connecting the image capturing device with the corresponding wireless network based on a generated command in real time in step 200. In one embodiment, connecting the image capturing device with the corresponding wireless network based on the generated command in real time includes connecting the image capturing device with the corresponding wireless network based on the generated command in real time by a configuration module.

The method 140 also includes notifying a user based on configured wireless network input in step 210. In one embodiment, notifying the user based on configured wireless network input includes notifying the user based on configured wireless network input by a notification module.

The method 140 further includes storing the plurality of captured data and the plurality of analysed data. In one embodiment, storing the plurality of captured data and the plurality of analysed data includes storing the plurality of captured data and the plurality of analysed data by a memory storage subsystem.

Present disclosure a system to configure an image capturing device with a wireless network proposes automatic configuration. Here, the present disclosure proposes automatic detection of required credentials. The credentials may be stored in text form or in unique code form. Further, establishment of required connection is fast and provides extra layer of security. Unsecured network channel manual connection is prevented by the use of the disclosed invention.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A system to configure an image capturing device with a wireless network, comprising:
    a processing subsystem communicatively coupled with the image capturing device, comprising:
        a data retrieving module configured to:
            capture plurality of data using macro focus feature from the image capturing device, wherein the plurality of data comprises data synced within a pre-defined figures, wherein the pre-defined figures comprises at least one of a unique code, a text and a metadata of previously synced data;
            retrieve specific data from at least one of the plurality of data associated with a wireless network;
        a data analyzing module operatively coupled to the data retrieving module, and configured to analyze a plurality of retrieved specific data, wherein the retrieved specific data comprises of access point Service Set Identifier (SSID), type of security protocol, and wireless security password, by an analyzing technique comprising at least one of optical character recognition (OCR) and natural language processing (NLP) in real time;
        an identification module operatively coupled to the data analyzing module, and configured to:
            identify a corresponding wireless network based on plurality of analyzed specific data;
            generate a command to connect with the corresponding wireless network;
        a configuration module operatively coupled to the identification module, and configured to:
            connect the image capturing device with the corresponding wireless network based on the generated command in real time;
            switch the image capturing device from a configuration mode to a streaming mode upon connecting to the wireless network;
        a notification module operatively coupled to the configuration module, wherein the notification module is configured to generate a notification for indicating the successful connection to the wireless network; and
    a memory subsystem operatively coupled to the processing subsystem, and configured to store the plurality of captured data and the plurality of analyzed data, wherein the storage comprises at least one of remote storage and local storage.

2. The system as claimed in claim 1, the notification generated by the notification module comprises at least one of Light emitting diode (LED) indication and sound alarm.

3. A method for configuring an image capturing device with a wireless network, comprising:
    capturing, by the image capturing device, a plurality of data, wherein the plurality of data comprises data synced within a pre-defined figures, wherein the pre-defined figures comprises at least one of a unique code, a text and metadata of previously synced data;

retrieving, by a data retrieval module, specific data from at least one of the plurality of data associated with a wireless network;

analyzing, by a data analyzing module, a plurality of retrieved specific data, wherein the retrieved specific data comprises of access point Service Set Identifier (SSID), type of security protocol, and wireless security password, by an analyzing technique comprising at least one of optical character recognition (OCR) and natural language processing (NLP) in real time;

identifying, by an identification module, a corresponding wireless network based on a plurality of analyzed specific data;

generating, by the identification module, command to connect with the corresponding wireless network;

connecting, by a configuration module, the image capturing device with the corresponding wireless network based on the generated command in real time;

switching, by a configuration module, the image capturing device from a configuration mode to a streaming mode; and notifying, by a notification module, a user upon successful connection to the wireless network by at least one of Light emitting diode (LED) indication and sound alarm.

4. The method as claimed in claim 3, further comprises storing, by a memory subsystem, the plurality of captured data and the plurality of analyzed data, wherein the storage comprises at least one of remote storage and local storage.

\* \* \* \* \*